US011393011B2

(12) United States Patent
Klein et al.

(10) Patent No.: US 11,393,011 B2
(45) Date of Patent: *Jul. 19, 2022

(54) CUSTOMER CENTRIC ELECTRONIC MARKETPLACE

(71) Applicant: SIMPLELIST CORPORATION, Danbury, CT (US)

(72) Inventors: Christopher Michael Klein, Santa Rosa, CA (US); Wesley Long, Danbury, CT (US); Tracy Feldman, Winter Park, CO (US)

(73) Assignee: SIMPLELIST CORPORATION, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,872

(22) Filed: Jun. 24, 2019

(65) Prior Publication Data

US 2020/0294113 A1   Sep. 17, 2020

Related U.S. Application Data

(63) Continuation-in-part of application No. 16/298,885, filed on Mar. 11, 2019.

(51) Int. Cl.
*G06Q 30/06* (2012.01)
*G06Q 30/02* (2012.01)

(52) U.S. Cl.
CPC ..... *G06Q 30/0633* (2013.01); *G06Q 30/0253* (2013.01); *G06Q 30/0255* (2013.01); *G06Q 30/0275* (2013.01)

(58) Field of Classification Search
CPC ........... G06Q 30/0242; G06Q 30/0276; G06Q 30/0609; G06Q 30/0275; G06Q 30/0633

USPC ........................................................ 705/26.8
See application file for complete search history.

(56) References Cited

U.S. PATENT DOCUMENTS

| 7,778,890 | B1 * | 8/2010 | Bezos | ............... | G06Q 30/0633 |
| | | | | | 705/26.1 |
| 2007/0067297 | A1 * | 3/2007 | Kublickis | ............. | G06Q 30/02 |
| | | | | | 707/999.009 |
| 2009/0271270 | A1 * | 10/2009 | Regmi | ............... | G06Q 30/0217 |
| | | | | | 705/14.56 |

(Continued)

OTHER PUBLICATIONS

AAPPeC: Agent-based Architecture for Privacy Payoff in eCommerce by Abdulsalam Yassine (Year: 2010).*

*Primary Examiner* — Victoria E. Frunzi
(74) *Attorney, Agent, or Firm* — Donald J Lenkszus

(57) ABSTRACT

An electronic marketplace provides a communication platform between consumer and sellers. Consumers create product wish lists and the wish lists are used as the basis for product advertising from the sellers. In addition, a consumer may invite friends to view the wish list and purchase particular products that are added to the wish list. Because wish lists are used as the basis for advertising, consumers can manage the types of product advertising that they see. In addition, consumers have the ability to turn off individual product advertisements by removing that product from the wish list. Sellers utilize reverse bidding to compete for advertising space with each consumer and friend. One particularly advantageous feature of the embodiment is that wish lists serve as nameless and untraceable proxies for each member by keeping personal information removed from the sellers.

18 Claims, 4 Drawing Sheets

(56) References Cited

U.S. PATENT DOCUMENTS

| | | | |
|---|---|---|---|
| 2013/0030902 A1* | 1/2013 | Paschkes | G06Q 30/0239 |
| | | | 705/14.35 |
| 2013/0036029 A1* | 2/2013 | Patt | G06Q 30/08 |
| | | | 705/27.1 |
| 2013/0046648 A1* | 2/2013 | Calman | G06Q 30/08 |
| | | | 705/26.3 |
| 2013/0110639 A1* | 5/2013 | So | G06Q 30/02 |
| | | | 705/14.66 |
| 2016/0225022 A1* | 8/2016 | Kurapati | G06F 16/958 |
| 2016/0225029 A1* | 8/2016 | VanDeVelde | G06Q 30/0275 |

* cited by examiner

CUSTOMER CENTRIC ELECTRONIC MARKETPLACE

RELATED APPLICATIONS

The present invention is a continuation-in-part of U.S. patent application Ser. No. 16/298,885 filed on Mar. 11, 2019.

FIELD OF THE INVENTION

The present invention relates to electronic commerce, in general, and to methods, systems and software for providing electronic commerce, in particular.

BACKGROUND OF THE INVENTION

Consumer use of electronic commerce via the Internet is widespread. However, one consumer oriented problem that is endemic to electronic commerce it the nuisance presented by advertisements that pop up as banner ads and the like. By way of example, when a consumer initiates a search for a product, advertisements for that product seem to follow the consumer as different web sites are entered. There currently is no way for capturing why the consumer searched for something, updating the consumer's preferences after the product is purchased, or stopping advertisements for a product after the consumer becomes uninterested in the product.

A typical product seller marketing strategy utilizes platforms like Google AdWords and Facebook to leverage a consumer's browser's cookies and show ads for products the consumer may not even be interested in purchasing. This marketing strategy is highly inaccurate, usually irrelevant, and ultimately ineffective.

Product seller electronic commerce marketing strategies typically are based on pay-per-click. However pay-per-click marketing is both confusing and variable. In addition, when pay-per-click is utilized, the product seller lacks the ability to accurately budget for advertising campaigns because of the unpredictability of how many views or clicks will occur. No standardized metrics exist to analyze the success of a pay-per-click campaign. The result is that product sellers are left wondering how click-through ratings affect their bottom lines.

It would be highly desirable to provide for electronic commerce in which the foregoing drawbacks and problems are eliminated.

SUMMARY

In accordance with the principles of the invention an electronic marketplace method, system, and software are provided that does not have the problems and drawbacks of prior electronic marketplaces.

The electronic marketplace of the embodiment provides a communication platform between sellers and buyers. Buyers create product wish lists and the wish lists are used as the basis for product advertising from the sellers. Because wish lists are used as the basis for advertising, the buyers can manage the types of product advertising that they see. In addition, buyers have the ability to turn off individual product advertisements by removing that product from the wish list. Sellers utilize reverse bidding to compete for advertising space with each seller. One particularly advantageous feature of the embodiment is that sellers can create unlimited advertisements without creating advertising spam.

In various embodiments all interactions between buyers and sellers take place in a buyer data free zone. Wish lists serve as nameless and untraceable proxies for each member by keeping personal information removed from the sellers. The wish lists operate to collect deals without any data markers linking the wish lists to individual buyers.

In an embodiment of a computer implemented method of providing an electronic marketplace, the method comprises providing one or more web pages hosted on one or more servers; receiving a request from a particular consumer to register as a member of the electronic marketplace; registering the particular consumer as a member of the electronic marketplace and establishing a product wish list for the member. The wish list is accessible by the member via a dedicated one of the one or more webpages. The embodiment further comprises providing one or more partner web pages hosted on the one or more servers; receiving requests from sellers to register as partners on the electronic marketplace, each seller having a product listing. The embodiment comprises registering the sellers as partners on the electronic marketplace; accessing each partner product listing for inclusion in the electronic marketplace. Each partner product listing is searchable by the member without providing any member data markers to partners. The embodiment comprises accepting a request from the member to add a particular product from one the partner product listing to the wish list; operating each wish list as a nameless and untraceable proxy between the members to the partners; The embodiment comprises automatically notifying partners that the particular product has been added to a wish list at a current price without providing any data markers linking to any member. The method further comprises initiating a reverse bidding sequence without providing any data markers to partners linking to any member. The reverse bidding sequence comprises receiving a request from one or more partners to generate an advertisement for the particular product, the advertisement comprising a particular price; determining the current lowest price for the particular product from all the-advertisements for the particular product; operating one or more servers to forward the advertisement having the current lowest price for the particular product to the wish list; notifying the one or more of partners of the current lowest price of the particular product; and repeating the reverse bidding sequence until the member purchases the particular product or removes the particular product from the wish list. The embodiment further comprise terminating all further advertisements for the particular product from all of the partners to the member upon the earlier of a purchase of the particular product and removal of the particular product from the wish list.

The embodiment may further comprise receiving a request from the member to invite one or more friends to have access to the wish list; creating an invitation to each of the one or more friends to become a member and have access to the wish list; permitting all of the one or more friends that accept the invitation and become members to have access to the wish list; and operating the marketplace to act as a nameless and untraceable proxy to the partners for each member.

The embodiment may further comprise utilizing each wish list to collect product deals from the partners without providing any data markers linking each wish list to any member.

The embodiment may further comprise providing the advertisement having the current lowest price for the particular product to the one or more friends that become members.

The embodiment may further comprise terminating all further advertisements for the particular product from all partners to the member friends upon the earlier of a purchase of the particular product and removal of the particular product from the wish list.

The embodiment may further comprise terminating all further advertisements for the particular product from all partners to the member friends and to the member upon the earlier of removal of the particular product from the wish list by the member, or a purchase of the particular product either by one of the member friends or the member.

The embodiment may further comprise utilizing the one or more servers to provide a bidding platform for the partners; operating the bidding platform to execute the reverse bidding sequence.

The embodiment may further comprise registering the sellers as partners for predetermined subscription prices; and allowing each the partner to create an unlimited number of advertisements for the partner's products.

The embodiment may further comprise providing each partner electronic access to real time data for key performance indicators.

The embodiment may further comprise selecting the key performance indicators to be one or more of: total cost, average member reach, total reach, purchase percentage, total purchases, cost per purchase, average sales, total sales, and ROI (return on investment) for a selectable predetermined period.

The embodiment may further comprise permitting each partner to construct advertising campaigns utilizing a corresponding dedicated partner web page.

A further embodiment of a computer implemented method of providing an electronic marketplace in which interactions between consumers and advertisers take place in a consumer data free zone in which advertisers do not have access to consumer data and information comprises providing one or more member web pages hosted on one or more servers; receiving a request via one of the one or more member web pages from a particular consumer to register as a member of the electronic marketplace; registering the particular consumer as a member of the electronic marketplace and establishing a product wish list for the member on a dedicated one of the one or more member webpages. The further embodiment comprises providing one or more partner web pages hosted on the one or more servers; receiving requests via the one or more partner web pages from sellers to register as partners on the electronic marketplace; registering the sellers as partners on the electronic marketplace, each partner providing the electronic marketplace access to the partner's product listings such that the member may browse and search each partner's product listings without the partner having any access to data markers linking to the member. The further embodiment further comprises accepting a request from the member to add a particular product to the wish list; automatically notifying the partners that the particular product has been added to a wish list, the wish list serving as a nameless and untraceable proxy for the member to the partners; and initiating a reverse bidding sequence without providing any data markers to the partners linking to an individual member. The reverse bidding process comprises receiving a request from one or more of partners to generate an advertisement for the particular product, the advertisement comprising a particular price for a particular time period; utilizing the one or more servers to determine a current lowest price for the particular product from all of the advertisements; operating the one or more servers to forward the advertisement having the current lowest price for the particular product to the member; notifying the one or more of the partners of the current lowest price of the particular product; replacing the advertisement with the advertisement having the next lowest price upon the expiration of the particular time period; and repeating the reverse bidding sequence until the member purchases the particular product or removes the particular product from the wish list. The further embodiment comprises terminating all further advertisements for the particular product from all partners to the member upon the earlier of a purchase of the particular product and removal of the particular product from the wish list; and operating the marketplace to provide that interactions between consumers and advertisers take place in a consumer data free zone in which advertisers do not have access to data and information of the member.

The further embodiment may further comprise operating each partner web page to permit each partner to generate an advertising campaign based upon the particular product.

The further embodiment may further comprise receiving a request from the member to invite one or more friends to have access to the wish list; creating an invitation to each of the one or more friends to become a member and have access to the wish list; and permitting each of the one or more friends that accept the invitation and become a friend member to have access to the wish list.

The further embodiment may further comprise forwarding the advertisement having the current lowest price for the particular product to each friend member; and operating the marketplace to act as a nameless and untraceable proxy for each friend member to the partners.

The further embodiment may further comprise terminating all further advertisements for the particular product from all partners to the friend members and to the member upon the earlier of removal of the particular product from the wish list by the member or a purchase of the particular product by either a friend member or the member.

The further embodiment may further comprise registering the sellers as partners for predetermined subscription prices. The subscription prices permit each partner access to a dedicated partner web page, the dedicated partner web page allowing each partner to create an unlimited number of advertisements for the partner's products.

The further embodiment may further comprise, displaying on the dedicated partner web page, data for key performance indicators, the data updated by the one or more servers in real time; and selecting the key performance indicators to be one or more of: total cost, average member reach, total reach, purchase percentage, total purchases, cost per purchase, average sales, total sales, ROI (return on investment) current month, and ROI year to date.

A computer implemented electronic marketplace embodiment provides a method comprising receiving a request from a particular consumer or buyer to register as a member of the electronic marketplace, registering the consumer as a member of said electronic marketplace, and establishing a wish list for the member on a dedicated one or more web pages.

The method further comprises permitting one or more friends identified by the member to have access to the wish list.

In addition, the method includes receiving requests from sellers to register as partners on the electronic marketplace and accessing each seller's product listing for inclusion in the electronic marketplace, said product listing being available for searching and browsing by each said member.

The method further comprises accepting a request from said member to add a particular product of said products to said wish list; and automatically notifying each of said friends that said particular product has been added to said wish list.

Still further, the method comprises automatically notifying each of the partners that sells said particular product that the particular product has been added to a wish list; and initiating a reverse bidding sequence and partner advertising campaigns.

The reverse bidding process and advertising campaigns comprise receiving a request from one or more of the partners to provide corresponding advertisements for the particular product, said advertisement comprising a particular price, utilizing one or more of the servers to determine from all of the advertisement requests a current lowest price for the particular product, operating the one or more servers to forward the advertisement having the current lowest price to the member to replace the listing of said particular product on the member's wish list, notifying the one or more of partners of the current lowest price of the particular product, and repeating the reverse bidding sequence until the member purchases the particular product or the particular product is removed from said wish list.

The method of the electronic marketplace additionally comprises terminating all further advertisements for the particular product from all of the partners upon the earlier of a purchase of the particular product or removal of the particular product from said wish list.

A computer implemented electronic marketplace embodiment may additionally comprise receiving a request from a member to invite one or more friends to have access to the member's wish list. The electronic marketplace operates automatically creating an invitation to each of the one or more friends to become a member and have access to the member's wish list, and permitting all of said one or more friends that accept said invitation and become members to have access to said wish list.

Further, the method may comprise providing the advertisement having the current lowest price for the particular product to the one or more friends that become members.

The method may also comprise terminating all further advertisements for the particular product from all of partners to the member friends that upon the earlier of a purchase of the particular product or removal of the particular product from the wish list.

The method may also comprise terminating all further advertisements for the particular product from all partners to the member friends and to the member upon the earlier of a purchase of the particular product by either the member friends or the member, or removal of the particular product from the wish list by the member.

The method may comprise utilizing the one or more servers to provide a bidding platform for the partners and operating the bidding platform to execute the reverse bidding sequence.

The method may comprise registering the sellers as partners for predetermined subscription prices permitting each partner to create an unlimited number of advertisements for said partner's products.

The method may comprise providing to each partner access to data for key performance indicators and updates to the data in real time.

The method may further comprise providing access to reports of key performance indicators for the partner's advertisements.

The method may additionally comprise permitting each partner to select said key performance indicators.

The method may comprise selecting key performance indicators to be one or more of: total cost, average member reach, total reach, purchase percentage, total purchases, cost per purchase, average sales, total sales, ROI (return on investment) for a predetermined period, e.g. current month, year to date.

The method may comprise permitting each partner to construct advertising campaigns utilizing a corresponding dedicated partner web page.

A second embodiment of a computer implemented method of providing an electronic marketplace comprises one or more servers. The method comprises receiving a request via a web page from a particular consumer to register as a member of said electronic marketplace, and registering the particular consumer as a member of the electronic marketplace and establishing a product wish list for the member on a dedicated member webpage.

The second embodiment comprises receiving requests via from sellers to register as partners on the electronic marketplace and registering each seller as a partner on the electronic marketplace, each partner providing said electronic marketplace access to said partner's product listings such that said member may browse and search said partner's product listings.

The second embodiment comprises accepting a request from a member to add a particular product to the wish list and automatically notifying the partners that sell the particular product that it has been added to a wish list, thereby initiating a reverse bidding sequence.

The reverse bidding process comprises receiving a request from one or more of the partners to generate an advertisement for the particular product at price for a time period, determining a current lowest price for said particular product from all advertisements. The reverse bidding process further comprises forwarding the advertisement having the current lowest price for the particular product to the member for acceptance to the wish list, replacing the advertisement of the particular product on the wish list with the advertisement having the current lowest price, notifying the partners of the current lowest price of the particular product; and repeating the reverse bidding sequence until the member purchases the particular product or removes the particular product from the wish list.

In the reverse bidding process, if the time period for a listing of the particular product expires, the advertisement listing having the next lowest price becomes the current listing.

The method of the second embodiment further comprises terminating all further advertisement listings for the particular product from all of partners to the member upon the earlier of a purchase of the particular product or removal of the particular product from the wish list.

The method of the second embodiment may further comprise providing each partner with one or more dedicated web pages utilizable for each partner to generate an advertising campaign based upon the particular product.

The method of the second embodiment may further comprise receiving a request from a member to invite one or more friends to have access to the wish list, automatically creating an invitation to each friend to become a member and have access to the wish list, and permitting all friends that accept the invitation and become members to have access to view the wish list and purchase any particular product thereon.

The method of the second embodiment may further comprise forwarding the advertisement listing having the current lowest price for the particular product to friends that become members.

The method of the second embodiment further comprises terminating all further advertisement listings for the particular product to the friends that become members upon the earlier of a purchase of the particular product or removal of the particular product from said wish list.

The method of the second embodiment may comprise terminating all further advertisement listings for the particular product from all partners to the member friends and to the member upon the earlier of a purchase of the particular product by either the member friends or purchase by the member, or removal of the particular product from the wish list by the member.

The method of the second embodiment may comprise utilizing one or more servers to provide a bidding platform for the partners and operating the bidding platform to execute the reverse bidding sequence.

The method of the second embodiment may comprise registering each seller as a partner for a predetermined subscription price permitting the partner to create an unlimited number of advertisement listings during a subscription period.

The method of the second embodiment may comprise permitting each said partner to construct advertising campaigns utilizing a corresponding dedicated partner web page.

A computer implemented electronic marketplace system embodiment comprises one or more servers, apparatus providing said one or more servers with access to a wide area network, and a non-transitory computer-readable medium encoded with computer-executable instructions and executable by the one or more servers for providing a method for an electronic marketplace. The method comprises receiving a request from a particular consumer or buyer to register as a member of the electronic marketplace, registering the consumer as a member of said electronic marketplace, and establishing a wish list for the member on a dedicated one or more web pages.

The method further comprises permitting one or more friends identified by the member to have access to the wish list.

In addition, the method includes receiving requests from sellers to register as partners on the electronic marketplace and accessing each seller's product listing for inclusion in the electronic marketplace, said product listing being available for searching and browsing by each said member.

The method further comprises accepting a request from said member to add a particular product of said products to said wish list; and automatically notifying each of said friends that said particular product has been added to said wish list.

Still further, the method comprises automatically notifying each of the partners that sells said particular product that the particular product has been added to a wish list; and initiating a reverse bidding sequence and partner advertising campaigns.

The reverse bidding process and advertising campaigns comprise receiving a request from one or more of the partners to provide corresponding advertisements for the particular product, said advertisement comprising a particular price, utilizing one or more of the servers to determine from all of the advertisement requests a current lowest price for the particular product, operating the one or more servers to forward the advertisement having the current lowest price to the member to replace the listing of said particular product on the member's wish list, notifying the one or more of partners of the current lowest price of the particular product, and repeating the reverse bidding sequence until the member purchases the particular product or the particular product is removed from said wish list.

The method of the electronic marketplace additionally comprises terminating all further advertisements for the particular product from all of the partners upon the earlier of a purchase of the particular product or removal of the particular product from said wish list.

A computer implemented electronic marketplace embodiment may additionally comprise receiving a request from a member to invite one or more friends to have access to the member's wish list. The electronic marketplace operates automatically creating an invitation to each of the one or more friends to become a member and have access to the member's wish list, and permitting all of said one or more friends that accept said invitation and become members to have access to said wish list.

Further, the method may comprise providing the advertisement having the current lowest price for the particular product to the one or more friends that become members.

The method may also comprise terminating all further advertisements for the particular product from all of partners to the member friends that upon the earlier of a purchase of the particular product or removal of the particular product from the wish list.

The method may also comprise terminating all further advertisements for the particular product from all partners to the member friends and to the member upon the earlier of a purchase of the particular product by either the member friends or the member, or removal of the particular product from the wish list by the member.

The method may comprise utilizing the one or more servers to provide a bidding platform for the partners and operating the bidding platform to execute the reverse bidding sequence.

The method may comprise registering the sellers as partners for predetermined subscription prices permitting each partner to create an unlimited number of advertisements for said partner's products.

The method may comprise providing to each partner access to data for key performance indicators and updates to the data in real time.

The method may further comprise providing access to reports of key performance indicators for the partner's advertisements.

The method may additionally comprise permitting each partner to select said key performance indicators.

The method may comprise selecting key performance indicators to be one or more of: total cost, average member reach, total reach, purchase percentage, total purchases, cost per purchase, average sales, total sales, ROI (return on investment) for a predetermined period, e.g. current month, year to date.

The method may comprise permitting each partner to construct advertising campaigns utilizing a corresponding dedicated partner web page.

A further embodiment of a computer implemented electronic marketplace comprises one or more servers, apparatus providing said one or more servers with access to a wide area network, and a non-transitory computer-readable medium encoded with computer-executable instructions and executable by the one or more servers for providing a method for an electronic marketplace. The method comprises receiving a request via a web page from a particular consumer to register as a member of said electronic marketplace, and registering the particular consumer as a member of the electronic marketplace and establishing a product wish list for the member on a dedicated member webpage.

The further embodiment of a computer implemented electronic marketplace comprises receiving requests via from sellers to register as partners on the electronic marketplace and registering each seller as a partner on the electronic marketplace, each partner providing said electronic marketplace access to said partner's product listings such that said member may browse and search said partner's product listings.

The further embodiment of a computer implemented electronic marketplace comprises accepting a request from a member to add a particular product to the wish list and automatically notifying the partners that sell the particular product that it has been added to a wish list, thereby initiating a reverse bidding sequence.

The reverse bidding process comprises receiving a request from one or more of the partners to generate an advertisement for the particular product at price for a time period, determining a current lowest price for said particular product from all advertisements. The reverse bidding process further comprises forwarding the advertisement having the current lowest price for the particular product to the member for acceptance to the wish list, replacing the advertisement of the particular product on the wish list with the advertisement having the current lowest price, notifying the partners of the current lowest price of the particular product; and repeating the reverse bidding sequence until the member purchases the particular product or removes the particular product from the wish list.

In the reverse bidding process, if the time period for a listing of the particular product expires, the advertisement listing having the next lowest price becomes the current listing.

The further embodiment of a computer implemented electronic marketplace further comprises terminating all further advertisement listings for the particular product from all of partners to the member upon the earlier of a purchase of the particular product or removal of the particular product from the wish list.

The further embodiment of a computer implemented electronic marketplace may further comprise providing each partner with one or more dedicated web pages utilizable for each partner to generate an advertising campaign based upon the particular product.

The further embodiment of a computer implemented electronic marketplace may further comprise receiving a request from a member to invite one or more friends to have access to the wish list, automatically creating an invitation to each friend to become a member and have access to the wish list, and permitting all friends that accept the invitation and become members to have access to view the wish list and purchase any particular product thereon.

The further embodiment of a computer implemented electronic marketplace may further comprise forwarding the advertisement listing having the current lowest price for the particular product to friends that become members.

The further embodiment of a computer implemented electronic marketplace further comprises terminating all further advertisement listings for the particular product to the friends that become members upon the earlier of a purchase of the particular product or removal of the particular product from said wish list.

The further embodiment of a computer implemented electronic marketplace may comprise terminating all further advertisement listings for the particular product from all partners to the member friends and to the member upon the earlier of a purchase of the particular product by either the member friends or purchase by the member, or removal of the particular product from the wish list by the member.

The further embodiment of a computer implemented electronic marketplace may comprise utilizing one or more servers to provide a bidding platform for the partners and operating the bidding platform to execute the reverse bidding sequence.

The further embodiment of a computer implemented electronic marketplace may comprise registering each seller as a partner for a predetermined subscription price permitting the partner to create an unlimited number of advertisement listings during a subscription period.

The further embodiment of a computer implemented electronic marketplace may comprise permitting each said partner to construct advertising campaigns utilizing a corresponding dedicated partner web page.

Various embodiments of the invention comprise a non-transitory computer readable medium with computer executable instructions stored thereon executed by a processor to provide an electronic marketplace method as described herein above.

Further embodiments of the invention comprise a computer-program product for providing an electronic marketplace, wherein the electronic marketplace comprises one or more servers in communication with a wide area network, the product comprising a non-transitory computer-readable medium encoded with computer-executable instructions that, as a result of being executed by the one or more servers executes a method for providing the electronic marketplace as describe herein above.

DESCRIPTION OF THE DRAWING

The invention will be understood from a reading of the following detailed description of embodiments of the invention in which like reference designators are used to identify like elements and in which.

DETAILED DESCRIPTION

In accordance with principles of the invention, an electronic commerce platform combines both the consumer's and the advertisers' needs for a seamless and effective approach to online marketing.

An electronic commerce system, method and software are provided that provide consumer prompted product marketing in which the consumer controls an advertising conversation with sellers.

We have invented an electronic commerce platform that serves as a filter for the consumer. Sellers (advertisers) are notified when a product has been purchased or is no longer of interest to or relevant and advertising of that product is stopped with the dual result of no spam advertising to consumers and elimination of advertising budget waste.

All interactions between buyers and sellers take place in a "data free" zone. Buyer wish lists are utilized and the wish lists are used as nameless and untraceable proxies for buyers, keeping buyer personal information removed from sellers. The wish lists collect seller deals without permitting access by sellers to any data markers linking to individual buyers. In our system wish lists are on the front lines where buyers and sellers interact assuring that sensitive buyer personal information cannot be compromised because it never enters in the first place.

Our electronic commerce platform includes a data and reporting' system for sellers that captures key performance indictors to provide accurate, real-time data and analysis to accurately measure, and to properly manage, the return on investment (ROI) of online marketing campaigns.

In an embodiment of the invention, consumers reveal their product interests and purchase intentions via curated product wish lists.

Sellers create highly targeted electronic display advertisements, offering discounts and promotions directly to consumers who have indicated an interest in buying their products through wish lists.

Advantageously, the electronic commerce platform provides the sellers with unlimited advertisement creation and unlimited product campaigns for a fixed price and consumers receive zero spam over the electronic commerce platform.

Figure 1:
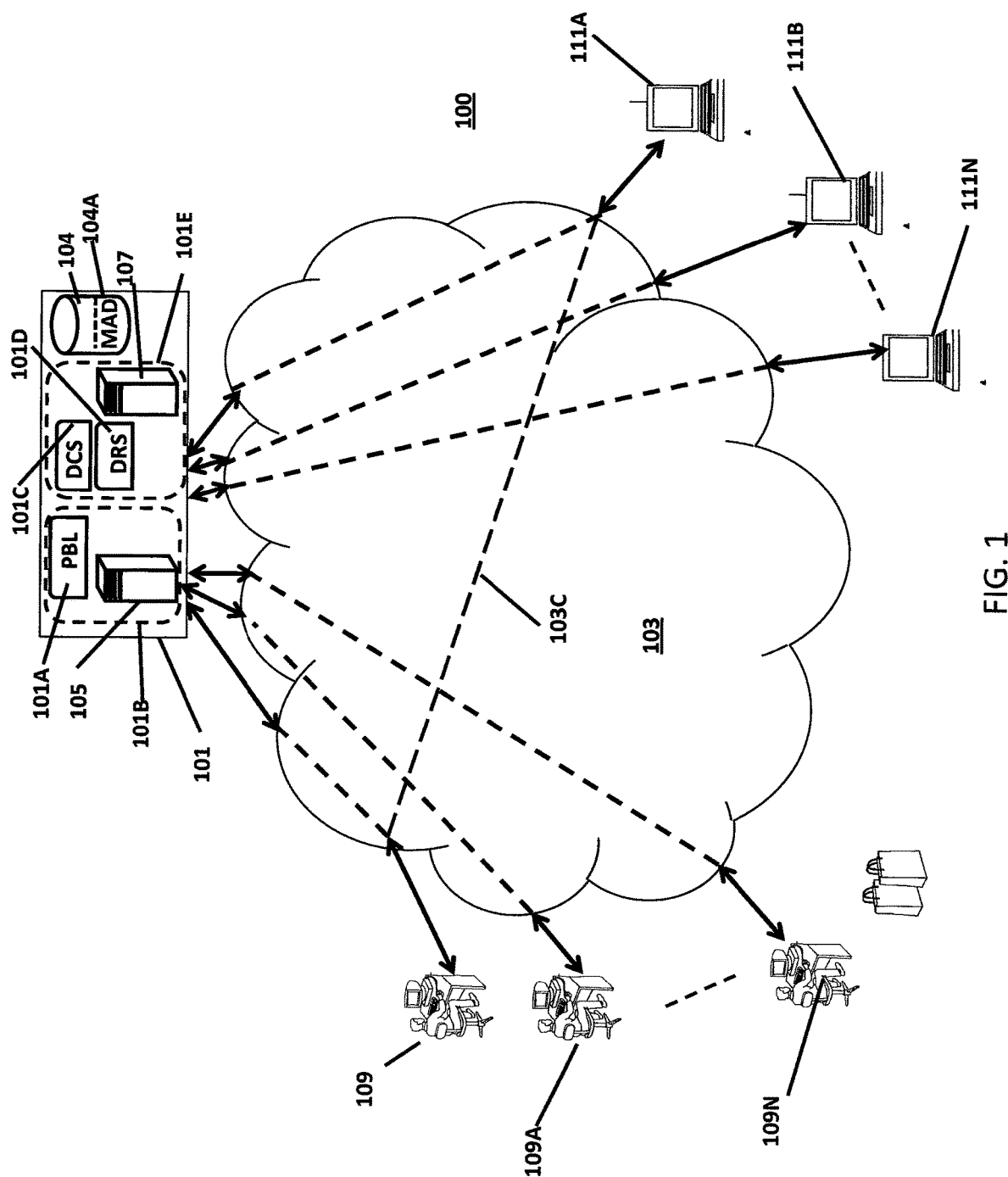
FIG. 1 is an illustration of electronic commerce in an embodiment of the invention.

Turning now to FIG. 1, one embodiment for an electronic marketplace 100 for electronic commerce is illustrated. In the method and system of the invention, electronic market place comprises an electronic commerce platform 101 that is accessible via the Internet 103. Other electronic networks that are not shown, as will be understood by those skilled in the art, may access electronic commerce platform 101.

Electronic commerce platform 101, as shown, comprises one or more servers 105, 107 that provide the various functions that are utilized in the embodiment. The one or more servers 105, 107 comprise computer software that when executed will provide the functionality set out herein below. In addition, electronic commerce platform comprises one or more databases 104. Although only one database 104 is shown, it will be understood by those skilled in the art that more than one database may be provided and the databases may be of various kinds of database structures and operations that are known in the art In operation, buyers or consumers and sellers both register with electronic commerce platform 101 to take advantage of the unique services provided.

By way of example, user 109 desires to participate in the electronic marketplace 100. User 109 accesses electronic access platform 101 via Internet 103 and registers as a "member", creating a username and password. The registration process can utilize any of the commonly used registration techniques.

Once user 109 registers as a member, electronic access platform 101 invites user 109 to generate a wish list of products that he desires and to identify friends that user 109 desires to have access to the wish list.

To generate the wish list, in one embodiment, user 109 may browse or search for products available from sellers that become "partners" 111A, 111B, . . . 111N that are registered with electronic access platform 101. Upon finding a product of interest, electronic access platform 101 may display the product along with its price to member 109. In addition, along with displaying the product, the display gives member 109 several options comprising updating the wish list, purchasing the product, suggesting the product to friends 109A . . . 109N, and declining further interest in the product. When a product is added to the wish list, the current product price is listed with the product.

Electronic access platform 101 also invites user 109 to build a social network by identifying friends 109A, . . . 109N to be invited to become members and to have access to the wish list. In identifying friends 109A, . . . 109N, user 109 provides electronic contact information for each friend 109A, . . . 109N. The electronic contact information may be, for example the' email addresses or smart phone contact information or other such contact information that may be used to receive an electronic invitation. Electronic access platform 101 generates and disseminates invitations to each friend 109A, . . . 109N. After each friend 109A, . . . 109N receives an invitation from electronic access platform 101, each friend 109A, . . . 109N registers to become a member of electronic marketplace 100 and upon becoming a member has access to the wish list of friend or member 109.

Each seller 107A, 107B, 107N that desires to participate in the electronic marketplace 100 accesses electronic access platform 101 via Internet 103 and registers as a "partner", creating a username and password. The registration process can utilize any of the commonly used registration techniques. In addition, each seller 107A, 107B, 107N provides site specific information For Amazon.com, the following information is provided: MWS (Amazon Marketplace Web Service) developer identification, AWS (Amazon Web Service) account identification, AWS access identification, secret key, Amazon seller identification, and MWS authentication token. For other sellers information comparable to that of Amazon.com is provided.

At the time each seller 107A, 107B, 107N registers to participate in the electronic marketplace 100, each seller 107A, 107B, 107N becomes a partner 107A, 107B, 107N in the electronic marketplace and agrees to pay a periodic fixed subscription payment. Payments are made through an electronic payment source. In one embodiment, partner subscription payments are through Stipe. In return for the subscription payments, each partner 107A, 107B, 107N is allowed to generate unlimited advertising campaigns as described herein below.

After a seller 107A, 107B, 107N registers to become a partner and inputs required information, electronic access platform 101 connects with the partner's web site application programming interface (API) and adds the partner's products to products that are available through electronic marketplace 100.

Figure 2:
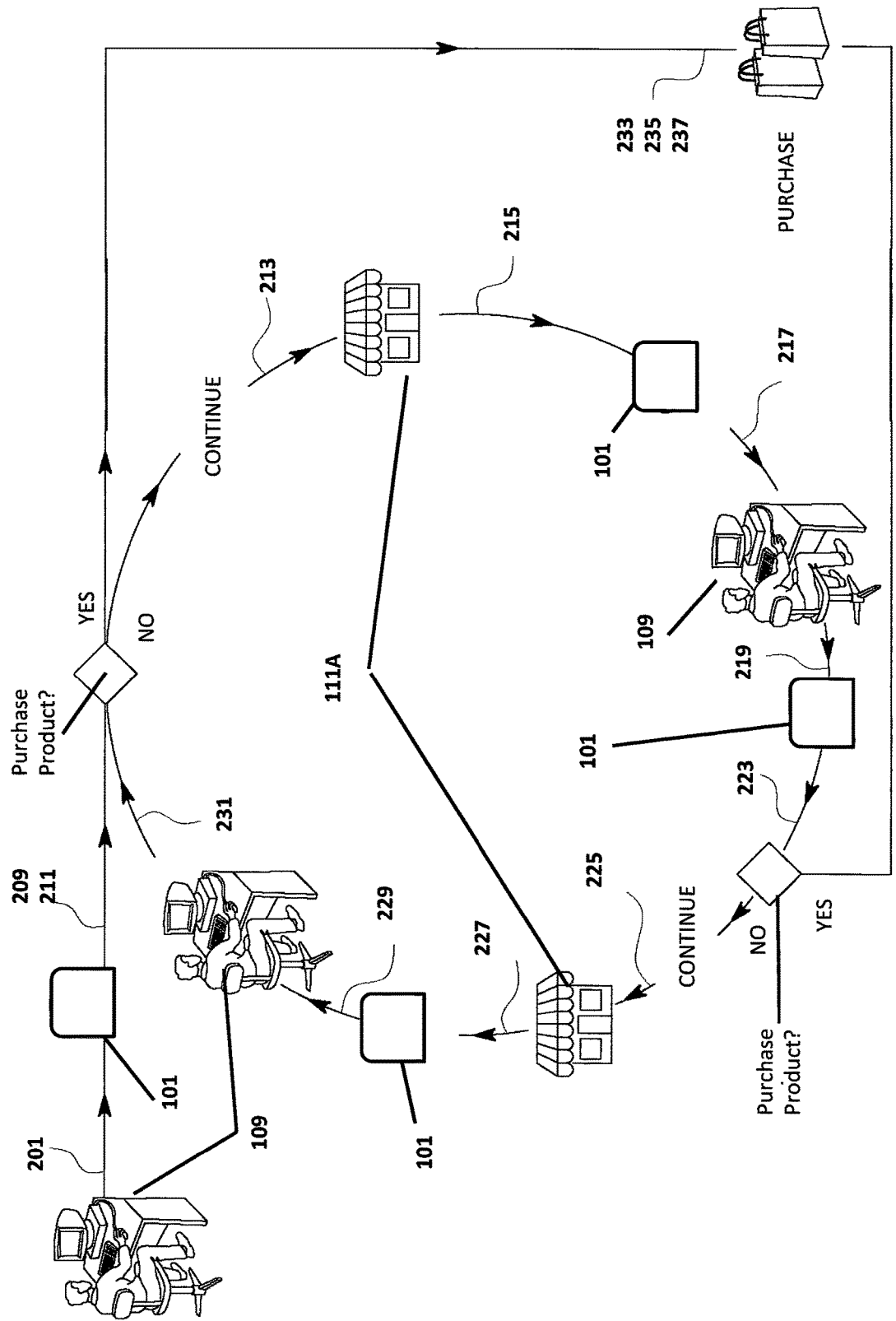
FIG. 2 is an illustration of the flow of electronic commerce in the embodiment of FIG. 1.
Figure 3:
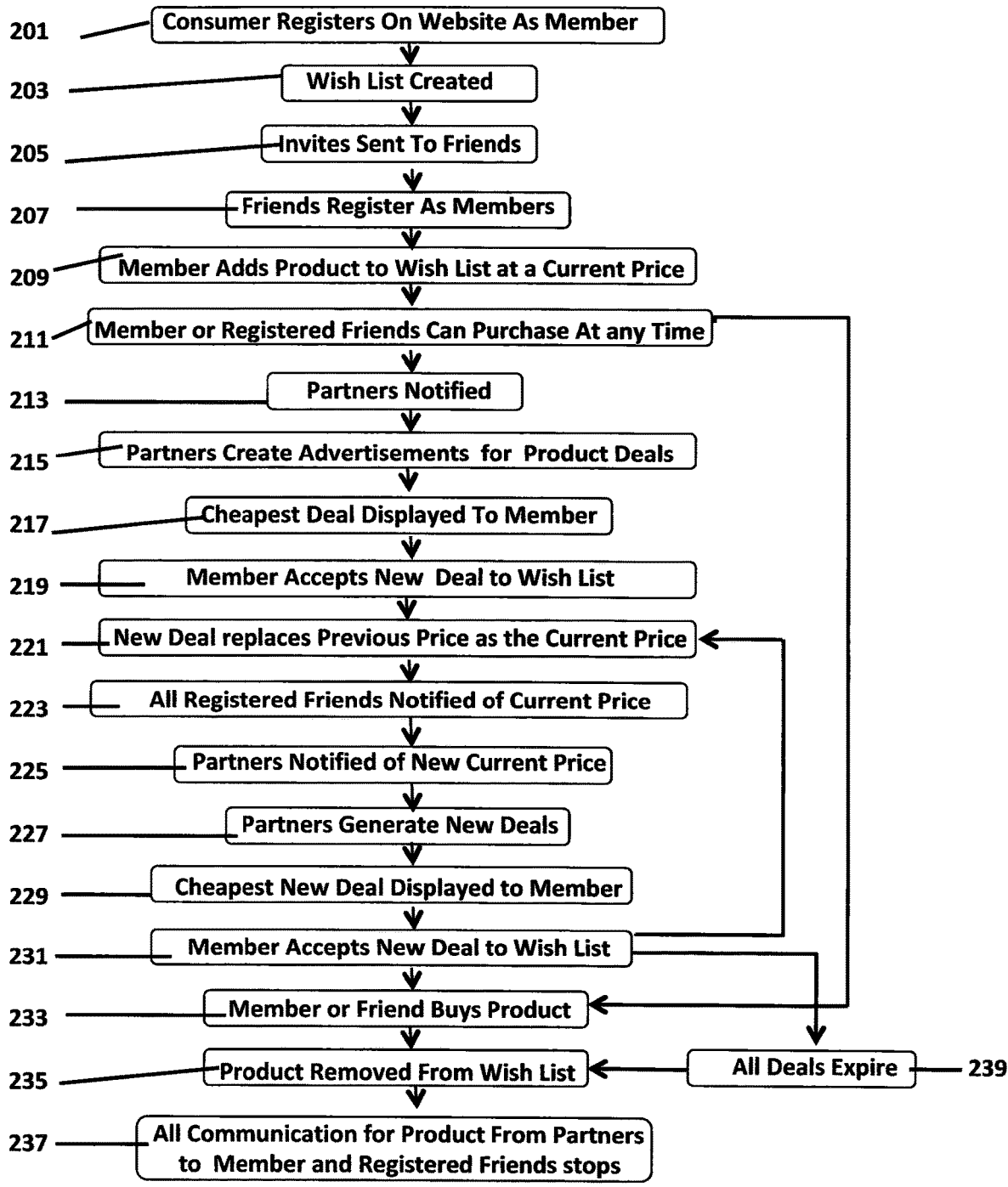
FIG. 3 is a flow diagram of a portion of an embodiment.

Certain features of the embodiment of FIG. 1 are described in conjunction with FIGS. 2 and 3. At step 201, consumer 109 registers as a member of electronic marketplace 100 by accessing electronic access platform 101. The registration process is described herein above.

At or after registration, at step 203 a wish list is established by electronic access platform 101 for consumer 109.

After registration and creation of a wish list, member 109 may list friends that he or she desires to receive invites to view his wish list and receive any deals that sellers who are registered as partners will provide for particular products that are on the wish list of member 109. In providing the list of friends, member 109 will also provide electronic contact information for each of the friends. The electronic contact information may, for example, comprise an email address for each friend and/or text contact information for each friend. Electronic access platform 101 automatically sends an electronic invitation to each friend that member 109 lists at step 205. Friends that accept the electronic invitation at step 207 are added to a wish list social network for member 109. In addition, member 109 may browse or search for friends, e.g., friend 109N, who are already registered as members of electronic access platform 101 in a manner similar to that used on social media platforms and add those friends found by browsing and/or searching to the list of friends.

At step 209, member 109 adds a particular product to the wish list. Member 109 may select the product from browsing or searching products available from electronic marketplace 100. The particular product will have a price associated with it.

The wish list of member 109 is available to each friend 109A . . . 109N who has registered with electronic access platform 101. As member 109 adds products to the wish list, electronic access platform 101 will notify each friend 1019A . . . 109N of addition of new products.

As indicated at step 211, member 109 or any friends 109A . . . 109N may, at any time, purchase any particular product that member 109 has listed on the wish list for the current price listed. If the particular product is purchased, electronic access platform 101, at step 235 removes that particular product from the wish list of member 109. In addition, as indicated at step 237, electronic access platform 101 terminates all further communication from partner sellers 111A . . . 111N to member 109 and friends 109A . . . 109 N via the wish lists with respect to that particular product.

After step 209, and assuming that the particular product has not been purchased by member 109 or friends 109A . . . 109 N, partners 111A . . . 111N are notified of the addition of the particular product to member 109 wish list.

At step 215, one or more partners 111A . . . 111N may generate a deal for the particular product. Each deal may comprise a price and a time duration that the price is effective. Some deals may comprise "flash" sales in which the prices are s particularly low for very limited time durations, e.g. 30 minutes.

At step 217, electronic access platform 101 determines which of the deals for the particular product presents the "best" deal, typically the lowest price for the particular product and presents the best deal to member 109 by forwarding the deal in the form of an advertisement to member 109.

Member 109 may review the best deal and either accepts the deal for presentation on the wish list or rejects the deal. At step 219, member 109 accepts the deal and, at step 221, electronic access platform 101 modifies the wish list to list the best deal for the particular product and the particular product price in the best deal becomes the current price.

At step 223, electronic access platform 101 notifies all of friends 109A . . . 109 N of the new current price for the particular product.

In addition, at step 225, electronic access platform 101 notifies all of partners 111A . . . 111N are notified of the deal accepted by member 109 and added to the wish list. Each partner 111A . . . 111N may decide to compete against the deal by generating a new, better deal at step 227.

Electronic access platform 101 determines which new, better deal is the best deal on the basis of price. At step 229, electronic access platform 101 transmits or displays the new better deal to member 109. Again, member 109 may accept or reject inclusion of the new deal onto the wish list. If member 109 does not accept the new deal for inclusion onto the wish list, the deal presently on the wish list is unchanged.

If member 109 accepts the new deal at step 231, the new deal replaces the current deal, the process returns to step 221 and repeats.

Each deal displayed on the wish list will remain until it expires or is replaced with a better deal or is removed by member 109. In the event that a deal expires, electronic access platform 101 will remove that deal from the wish list and present the next better, unexpired deal to member 109 for presentation to member 109 for inclusion on the wish list.

As pointed out above, in the event that member 109 or any of friends 109A . . . 109N purchase a product from the wish list, that particular product is removed from the wish list at step 235.

When a member 109 or friend 109A . . . 109N decides to purchase a particular product from the wish list of member 109, the purchase and sale transaction is performed directly between member 109 or the one friend 109A . . . 109N and the particular partner 111A that offered the deal that is accepted as indicated on FIG. 1 as Internet connection 103C.

When a particular product is removed from the wish list, all further communication from partners 111A . . . 111N to member 109 and friends 109A . . . 109N with respect to the particular product are terminated.

Since each deal from partners 111A . . . 111N is an advertisement for a particular product, electronic access platform 101 controls the flow of advertisements for particular products to member 109 and friends 109A . . . 109N. Accordingly, any consumer utilizing electronic marketplace 100 can safely browse for products without the result that browsing results in unwanted electronic advertisements being received.

Turning back to FIG. 1 electronic access platform 101 comprises price bidding logic software 101A. Price bidding logic 101A may reside on one or more of servers 105, 107 or may reside on a separate server that is not shown. In the embodiment shown, price bidding logic 101A resides on server 105. Price bidding logic 101A in conjunction with server 105 provides a price bidding platform 101B. Price bidding platform 101B provides a comprehensive bidding process for partners 111A . . . 111N to determine lowest possible product prices for members 109, 109A . . . 109N. Having multiple partners 111A . . . 111N of any product creates a bidding scenario where a group of members 109, 109A . . . 109N is continually offered lower prices via member console displays for a selected product on the wish list of member 109. The dynamic bidding process continues until 1) the product is purchased, or 2) member 109 removes the item from the wish list. Bidding platform data is collected and is made available for all products through a "real-time data and statistics tracking" service.

When member 109 puts adds a product to his or her wish list, the listed product price becomes the current low bid price for that item. All partners 111A . . . 111N selling that product can then only create a bidding campaign at a lower price. Price bidding logic 101A determines what deals can be created and be shown to member 109, 109A . . . 109N.

Price bidding logic 101A operates such that only the lowest price will be presented to member that has the product in his or her wish list. Bidding prices are based on predetermined bidding price increment rules.

In the embodiment, predetermined bidding price increment rules are as follows:

If the current low bid on the auction is from $0.01 to $0.99, the next bid must be at least $0.05 lower;
If the current low bid is $1.00 to $4.99, the next bid must be at least $0.25 lower;
If the current low bid is $5.00 to $24.99, the next bid must be at least $0.50 lower;
If the current low bid is $25.00 to $99.99, the next bid must be at least $1.00 lower;
If the current low bid is $100.00 to $249.99, the next bid must be at least $2.50 lower;

If the current low bid is $250.00 to $499.99, the next bid must be at least $5.00 lower;

If the current low bid is $500.00 to $999.99, the next bid must be at least $10.00 lower;

If the current low bid is $1,000.00 to $2,499.99, the next bid must be at least $25.00 lower;

If the current low bid is $2,500 to $4,999.99, the next bid must be at least $50.00 lower;

If the current low bid is $5,000.00 or higher, the next bid must be at least $100.00 lower;

Partners may set up advertising campaigns utilizing electronic access platform 101. In establishing an advertising campaign each partner 111A . . . 111N may provide a campaign data set of information to electronic access platform 101. The campaign data set in an illustrative embodiment comprises a specified product, a product price, an expiration date/time, an expiration quantity, and whether an autobid option is selected.

Electronic access platform 101 provides a partner dashboard display accessible by each partner 111A . . . 111N. Electronic access platform autofills a product into the partner electronic dashboard when alert or action is generated from a member 109, 109A . . . 109N by adding the product to a wish list or suggesting a product to a member friend.

The product price is required. The product price, at the least, complies with the pricing increment rules set out above.

An expiration date and time is not required but may be provided by the partner 111A . . . 111N when the product pricing or availability has a time limit.

An expiration quantity is not required but may be added when a limited amount of product from a Partner 111A . . . 111N is available to offer for a current campaign.

The autobid option is made available by a yes/no checkbox. If a partner 111A . . . 111N selects "yes" for the autobid option, a minimum price is required and must be entered and an available quantity must be entered. Price bidding logic 101A of electronic access platform 101 automatically enters a lower bid for a product whenever another partner provides a new current price for the product. The autobid function for a partner 111A . . . 111N ends when all the available product is sold. When an autobid option is selected the product price, expiration date/time, and expiration quantity are not entered.

All autobid pricing changes affect products in only in members 109, 109A . . . 109N wish lists. The same partner products show original, i.e., non autobid adjusted, pricing when a product is searched or browsed organically through a member electronic display console. Where, for example, a partner is Amazon.com and the searching or browsing is via Amazon.com, the original Amazon.com pricing stays the same as well. The use of wish lists becomes a strong incentive, because products added to wish lists receive better deals.

Product bidding platform 101B takes into consideration expiration data to manage the product deals. By way of example, assume member 109 puts product A into their wish list and that the current price for product A is $50.00. Further assume that there are 3 current partner sellers of product A and they each create a deal campaign as follows:

Partner 1: $40.00 with 1-week expiration
Partner 2: $45.00 with 2-week expiration
Partner 3: $30.00 with 30-minute expiration Each member having product A in their wish list will be able to purchase a "Flash Deal" alert for $30.00. The members can also add that deal to their wish list, which then alerts all connected member friends of the flash deal. After 30 minutes elapses, with no other partner making a lower deal, the price reverts to the original list price of $50.00 with an option for the $40.00 deal for the remainder of the original one week. After that original one week elapses, again with no partner making a lower deal, the price will revert to the original $50.00 with an option for the $45.00 deal for the remainder of the original two weeks.

At any time, Partners 111A . . . 111N can create an auto bid through partner bidding platform 101B. To do this, a partner 111A . . . 111N will determine 1) the lowest price they can sell that item for, and 2) the duration or product quantity. Once the lowest price number is designated, partner bidding platform 101B will auto-bid in their behalf against other Partners 111A . . . 111N selling and creating deals for the same product in the above stated increments for the product's price point.

Once the product bidding logic 101A determines the best current deal, that deal is given a data communication system (DCS) 101C. Data communication system 101C offers the price bidding logic 101A deal and collects member action response data from member 109 via the following four options presented to member 109:

Update My Wish List
Purchase Product
Suggest Product to Member Friends
No Thanks This member action response data (MAD) is stored as a file 104D in database 104 and is available through a data reporting system (DRS) 101D. MAD is collected and available for all partner products through a "real-time data and statistics tracking" service.

Figure 4:
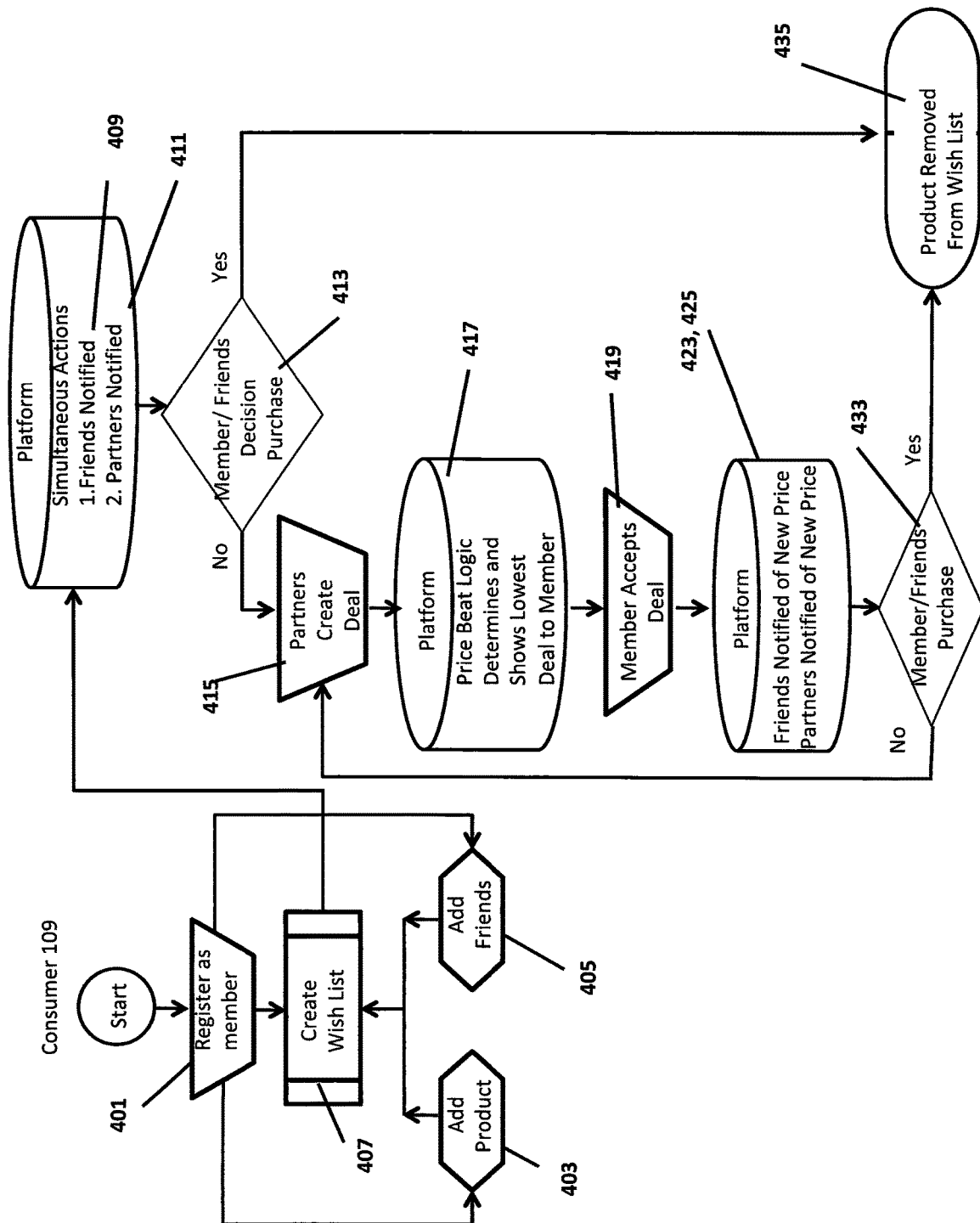
FIG. 4 is a logic diagram of a portion of an embodiment.

Turning now to FIG. 4, a flow diagram shows features of the system and method of the embodiment. Consumer 109 of FIG. 1 registers as a member of electronic marketplace 100 at 401. Consumer of member 109 adds particular product at 403 and at 405 adds friends 109A . . . 109N to create a wish list at 407.

Electronic access platform 101, upon member 109 adding a particular product to the wish list, notifies at friends 109A . . . 109N that the particular product has been added to the wish list 409 and simultaneously at 411 notifies all partners 111A . . . 111N that sell that particular product are notified that a member is interested in that particular product.

At decision 413, member 109 and friends 109A . . . 109N decide whether or not to purchase the particular product. If one decides to purchase the product at the price that it is listed, that particular product is removed from the wish list at 435.

If at decision 413, member 109 and friends 109A . . . 109N decide not to purchase the product at the current price, then the process continues and at 415 partners 111A . . . 111N that sell that particular product create deals for that particular product.

At 415, electronic access platform 101 utilizes an algorithm or logic to determine and show the best or lowest deal for the particular product to member 109. Member 109 has the option to accept the best deal for inclusion on the wish list or not.

At 417, assuming that member 109 has accepted the option to accept the best deal for inclusion on the wish list, electronic access platform 101 notifies friends 109A . . . 109N of the new deal at 423 and simultaneously notifies partners 111A. 111N of the newly accepted deal at 425.

At decision 433, member 109 and friends 109A . . . 109N decide whether to purchase the particular product at the new deal price. If one of member 109 and friends 109A . . . 109N decides to make the purchase, the particular product is then removed from the wish list at 435.

If none of member 109 and friends 109A . . . 109N decides to make the purchase, then the reverse bidding process repeats by returning to 415 where any of partners 111A. 111N may create a new deal for the particular product.

In the above described embodiment member created wish lists are the basis for seller advertising. The use of wish lists allows each member to manage what product advertisements are seen. Members have the ability to turn off particular product advertisements by removing that particular product from wish lists.

The embodiment further provides that partners compete for advertising space by reverse bidding of lowest sale price for particular products. In addition, sellers can create unlimited advertising for the products that they sell during a subscription period.

Instead of bidding on and purchasing advertising campaigns for each individual product as is the current norm for "pay per click" advertising, our novel embodiment allows partners to pay a set subscription price (monthly or yearly) for access to an electronic console that allows them to create unlimited advertisements for all products they sell.

That set subscription price permits a non-variable anchor number for algorithms to create multiple data sets. It allows partners a fixed number for budget purposes.

Electronic access platform 101 provides product placement performance information to partners 111A . . . 111N in the form of data and reports.

Data may be presented to the partners 111A . . . 111N via an electronic data console viewable online. The data console provides real time updates. Reports are also viewable via the electronic console and are downloadable and printable.

Both data and reports make available to partners information around Key Performance Indicators (KPIs) comprising:
1. Total Cost
2. Campaigns Created
3. Non Campaign Purchases
4. Average Member Reach
5. Total Reach
6. Purchase Percentage
7. Total Purchases
8. Cost Per Purchase
9. Average Sales
10. Total Sales
11. Return on Investment (ROI) Current Month
12. ROI Year to Date The Total Cost shows an accumulated or a divided Partner's cost number based on view.

Campaigns Created shows a total number of individual product campaigns/deals created based on view—either for the current month, or year to date accumulative.

The Average Member Reach shows an average of total member reach numbers for every campaign created for a selected view period.

Total Reach shows an accumulated total of total member reach numbers for every campaign created for a selected view period.

Purchase Percentage shows what percentages of purchases are made by members from the total number of campaigns/deals created based on selected view.

Total Purchases shows an accumulated number of member purchases from a total number of campaigns/deals created based on selected view.

Cost Per Purchase shows relationship number of purchases versus costs. It is calculated by dividing a "Total Cost" KPI by "Total Purchases" KPI based on a selected view.

Average Sales shows an average number of a total sales number for each campaign/deal based on a selected view.

Total Sales shows an accumulation number of a total sales number for each campaign/deal based on a selected view.

Return on Investment (ROI) shows a ROI percentage number based on a selected view and is calculated as follows: ROI=[(Total Sales−Total Cost)/Total Cost]*100.

The "selected view" is selectable on the electronic console by a partner from, for example, daily, weekly, monthly, or other selectable options.

It will be appreciated by those skilled in the art that databases 104 may be utilized to store and make available registration information for members and partners as well as storing wish lists for various members and storing partner product information. In addition, databases 104 may be utilized to store partner key performance indicator data and report information. It will further be appreciated by those skilled in the art that databases 104 as well as one or more servers may be cloud based.

It will further be appreciated by those skilled in the art that although particular details of each of the servers 105, 107 is not shown, servers typically comprise one or more processors and non-transitory computer readable medium storing computer programs.

In a further embodiment of the invention a member may "crowd source" payments for wish list products. At the time a member adds a product to a wish list member 109 may designate that he wishes to crowd source payment for the product. If member 109 selects a crowd source payment option for a product, each member friend 109A . . . 109N receives a notification that the particular product has been added to the member wish list and that member 109 has selected a crowd source option. With this functional option, each friend member 109A . . . 109N may contribute a portion towards the current price of the particular product. Electronic access platform 101 keeps track of crowd source payments from member friends 109A . . . 109N and member 109. When the total of the crowd source payments equals the current price of the particular product, electronic access platform 101 will access a crowd source function that will facilitate purchase of the particular product with crowd source payment aggregation.

Various embodiments of the invention comprise a non-transitory computer readable medium with computer executable instructions stored thereon executed by a processor to provide an electronic marketplace method as described herein above.

Further embodiments of the invention comprise a computer-program product for providing an electronic marketplace, wherein the electronic marketplace comprises one or more servers in communication with a wide area network, the product comprising a non-transitory computer-readable medium encoded with computer-executable instructions that, as a result of being executed by the one or more servers executes a method for providing the electronic marketplace as describe herein above.

The invention has been described in terms of various embodiments. It will be appreciated by those skilled in the art that the invention is not limited in scope to the embodiments that are shown and described herein. It is intended that the invention be limited in scope only by the attached claims and that the claims be given the broadest scope allowable in view of the prior art.

The invention claimed is:

1. A computer implemented method of providing a consumer centric electronic marketplace wherein a consumer controls advertisements received from advertisers, said method comprising:
providing one or more servers, said one or more servers comprising one or more memories storing machine readable instructions, said one or more servers coupled to an electronic network and executing said instructions for:
operating said one or more servers to receive via said network an electronic request at said one or more servers an electronic request from a particular consumer via a consumer device to register as a member of said electronic marketplace;
operating said one or more servers to respond to said electronic request to register said particular consumer as a member of said electronic marketplace, to provide said particular consumer access to at least one dedicated web page dedicated for use by said particular consumer, and to be responsive to requests from said consumer to establish a product wish list for said member, said product wish list accessible by said member over said network via said at least one dedicated webpage, said one or more servers utilizing said wish list to select advertisements to said member;
operating said one or more servers to host one or more dedicated partner web pages;
operating said one or more servers to receive electronic requests at said one or more servers from seller electronic devices to register as partners on said electronic marketplace, each of said sellers having an electronic product listing accessible by said electronic marketplace via said network;
operating said one or more servers to register said sellers as partners on said electronic marketplace and providing each said seller registered as a partner with at least one dedicated web page hosted by said electronic marketplace;
operating said one or more servers to access each said partner product listing and to include products from each said partner product listing in said electronic marketplace;
operating said one or more servers to permit said member to browse and search for said products included in said electronic marketplace without providing any customer data markers to said partners linking to said member;
operating said one or more servers to accept a request from said member to add a particular product from said electronic marketplace to said member's wish list;
operating said one or more servers to provide separate communication paths to said consumer device and to each said partner electronic devices to serve as a proxy between each said member and said partners to provide that each said member is nameless and untraceable by said partners and said consumer data and information including cookies on said consumer device are not available to each said seller electronic device;
operating said one or more servers to automatically send an electronic notification to said partners that said particular product has been added to a wish list at a current price without providing any data markers linking to any said member;
providing price bidding software instructions on said one or more servers;
executing said price bidding software instructions to initiate a reverse bidding sequence between said partners without providing any data markers to said partners linking to an individual member, said sequence comprising:
operating said one or more servers to receive an electronic request from one or more of said partners to generate an advertisement for said particular product, said advertisement comprising a particular price;
operating said one or more servers to determine a current lowest price for said particular product from all advertisements for said particular product from said one or more partners;
operating said one or more servers as a filter to forward said advertisement having the current lowest price for said particular product to said wish list;
operating said one or more servers to update said wish list to include said current lowest price on said member wish list only if said member has sent an electronic request to include said current lowest price on said wish list;
operating said one or more servers to automatically notify said one or more of said partners of the current lowest price of said particular product; and
operating said one or more servers to automatically repeat said reverse bidding sequence until said member purchases said particular product via said one or more servers or removes said particular product from said wish list;
operating said one or more servers to execute said instructions to use said wish list as the basis for filtering product advertising from said sellers sent to said member so that said member can search or browse for products on said electronic marketplace and not receive unwanted advertisements, said member controlling advertisements by adding and deleting particular products to said wish list;
operating said one or more servers to utilize said wish list to manage what advertisements are seen by said member; and
operating said one or more servers to execute said instructions to determine if said member purchases said particular product or removes said particular product from said wish list and to automatically terminate all further advertisements for said particular product from all of said partners to said member upon the earlier of a purchase of said particular product and removal of said particular product from said wish list.

2. A computer implemented method in accordance with claim 1, comprising:
operating said one or more servers to receive a request from said member to invite one or more friends to have access to said wish list;
operating said one or more servers to automatically generate an electronic invitation to each of said one or more friends to become a member and have access to said wish list;
operating said one or more servers to transmit each said electronic invitation to said one or more friends; and
operating said one or more servers to permit all of said one or more friends that accept said invitation and become members to have access to said wish list; and
operating said marketplace to act as a nameless and untraceable proxy for said members to said partners.

3. A computer implemented method in accordance with claim 2, comprising:
operating said one or more servers to utilize each said wish list to collect product deals from said partners without providing any data markers to said partners linking each said wish list to any said member.

4. A computer implemented method in accordance with claim 3, comprising:
operating said one or more servers to provide said advertisement having the current lowest price for said particular product to said one or more friends that become members.

5. A computer implemented method in accordance with claim 4, comprising:
operating said one or more servers to terminate all further advertisements for said particular product from all of said partners to said member friends upon the earlier of a purchase of said particular product and removal of said particular product from said wish list.

6. A computer implemented method in accordance with claim 4, comprising:
operating said one or more servers as a filter to control the flow of said advertisements to said member friends so that only advertisements for each said particular product on said member's wish list and products on said member friends corresponding wish lists are forwarded to said member friends; and
operating said one or more servers to terminate all further advertisements for said particular product from all of said partners to said member friends and to said member upon the earlier of removal of said particular product from said wish list by said member, or a purchase of said particular product either by one of said member friends or said member.

7. A computer implemented method in accordance with claim 2, comprising:
operating said one or more servers to provide a bidding platform for said partners; and
utilizing said bidding platform to execute said reverse bidding sequence.

8. A computer implemented method in accordance with claim 2, comprising:
operating said one or more servers to register said sellers as partners for predetermined subscription prices; and
operating said one or more servers to allow each said partner to create an unlimited number of advertisements for said partner's products.

9. A computer implemented method in accordance with claim 7, comprising:
operating said one or more servers to provide each said partner electronic access to real time data for key performance indicators.

10. A computer implemented method in accordance with claim 9, comprising:
operating said one or more servers to select said key performance indicators to be one or more of: total cost, average member reach, total reach, purchase percentage, total purchases, cost per purchase, average sales, total sales, and ROI (return on investment) for a selectable predetermined period.

11. A computer implemented method in accordance with claim 10, comprising:
operating said one or more servers to allow each said partner to construct advertising campaigns utilizing a corresponding dedicated partner web page.

12. A computer implemented method of providing an electronic marketplace in which interactions between consumers and advertisers take place in a consumer data free zone in which advertisers do not have access to consumer data and information and in which consumers control what advertisements are received from said advertisers, said method comprising:
operating one or more servers to provide said electronic marketplace, said one or more servers comprising one or more memories storing machine readable instructions;
said one or more servers executing said instructions by said one or more servers for;
operating said electronic marketplace to receive an electronic request via one of said one or more member web pages from a particular consumer to register as a member of said electronic marketplace;
operating said electronic marketplace to respond to said electronic request to register said particular consumer as a member of said electronic marketplace and to provide one or more member webpages for said member;
operating said electronic marketplace to permit said member to establish a product wish list for said member on at least one of said one or more dedicated member webpages;
operating said electronic marketplace to provide one or more partner web pages hosted on said one or more servers;
operating said electronic marketplace to receive electronic requests via said one or more partner web pages from sellers to register as partners on said electronic marketplace, each of said sellers having an electronic product listing;
operating said electronic marketplace to register said sellers as partners on said electronic marketplace, each said partner providing said electronic marketplace access to said partner's product listings;
operating said electronic marketplace to access each said partner's product listing and to obtain product information for inclusion in said electronic marketplace;
operating said electronic marketplace to utilize said product information to provide an electronic market place product listing that said member may browse and search without any said partner having any access to data markers linking to said member;
operating said electronic marketplace to accept a request from said member to add a particular product from said electronic marketplace product listing to said wish list;
operating said electronic marketplace to automatically notify said partners that said particular product has been added to a wish list, said electronic marketplace serving as a nameless and untraceable proxy between said member to said partners;
operating said electronic marketplace to initiate a reverse bidding sequence between said partners for said particular product without providing any data markers to said partners linking to an individual member comprising:
operating said electronic marketplace to receive a request from one or more of said partners to generate an advertisement for said particular product, said advertisement comprising a particular price for a particular time period;
operating said electronic marketplace to utilize said one or more servers to determine the advertisement having a current lowest price for said particular product from all of said advertisements;
operating said electronic marketplace to forward said advertisement having said current lowest price for said particular product to said member wish list;

operating said electronic marketplace to notify said one or more of said partners of said current lowest price of said particular product;

operating said electronic marketplace to replace said advertisement on said wish list with an advertisement having the next lowest price upon the expiration of said particular time period; and operating said electronic marketplace to repeat said reverse bidding sequence until said member purchases said particular product or removes said particular product from said wish list;

operating said electronic marketplace to execute said instructions to use said wish list as the basis for filtering product advertising from said partners sent to said member so that said member can browse or search for products on said electronic marketplace and not receive unwanted advertisements from said partners, said member controlling said filtering by adding or deleting products to or from said wish list;

operating said electronic marketplace to determine if said member purchases said particular product or removes said particular product from said wish list and to terminate all further advertisements for said particular product from all of said partners to said member upon the earlier of a purchase of said particular product and removal of said particular product from said wish list; and operating said electronic marketplace to provide separate communication paths to said consumer device and to each said partner electronic device to serve as a proxy between said member and said partners to provide that interactions between said member and said partners takes place via said electronic marketplace in a consumer data free zone in which said partners do not have access to data and information of said member and said consumer data and information including cookies on said consumer device are not available to each said seller electronic device.

13. A computer implemented method in accordance with claim 12, comprising:

operating said electronic marketplace to permit each said partner to generate an advertising campaign based upon said particular product.

14. A computer implemented method in accordance with claim 13, comprising:

operating said electronic marketplace to receive an electronic request from said member to invite one or more friends to have access to said wish list;

operating said electronic marketplace to create and to send an electronic invitation to each of said one or more friends to become a member and to have access to said wish list; and operating said electronic marketplace to permit each of said one or more friends that accept said invitation and become a friend member to have access to said wish list.

15. A computer implemented method in accordance with claim 14, comprising:

operating said electronic marketplace to forward said advertisement having said current lowest price for said particular product to each said friend member; and operating said electronic marketplace to act as a nameless and untraceable proxy between each of said friend members and said sellers.

16. A computer implemented method in accordance with claim 15, comprising:

operating said electronic marketplace to terminate all further advertisements for said particular product from all of said partners to said friend members and to said member upon the earlier of removal of said particular product from said wish list by said member or a purchase of said particular product by either a said friend member or said member.

17. A computer implemented method in accordance with claim 12, comprising:

operating said electronic marketplace to register said sellers as partners for predetermined subscription prices; and said subscription prices permitting each said partner access to a dedicated partner web page, said dedicated partner web page allowing each said partner to create an unlimited number of advertisements for said partner's products.

18. A computer implemented method in accordance with claim 17, comprising:

operating said electronic marketplace to display on said dedicated partner web page data key performance indicators, said data updated by said one or more servers in real time; and operating said electronic marketplace to select said key performance indicators to be one or more of: total cost, average member reach, total reach, purchase percentage, total purchases, cost per purchase, average sales, total sales, ROI (return on investment) current month, and ROI year to date.

\* \* \* \* \*